United States Patent [19]

Fontecchio et al.

[11] Patent Number: 5,340,147
[45] Date of Patent: Aug. 23, 1994

[54] AIR BAG INFLATOR ASSEMBLY

[75] Inventors: Robert P. Fontecchio, Rochester Hills; Thomas A. Ennis, Mt. Clemens; John A. Musiol, Southfield; Douglas E. Medvedik, Lake Orion; Nicola F. Paglia, Shelby Township, Morris County, all of Mich.

[73] Assignee: AlliedSignal Inc., Morristown, N.J.

[21] Appl. No.: 810,223

[22] Filed: Dec. 19, 1991

[51] Int. Cl.5 .............................. B60R 21/24
[52] U.S. Cl. ................. 280/728 A; 280/740; 280/729
[58] Field of Search ............. 280/728, 740, 741, 742, 280/743, 736, 729; 222/3, 5

[56] References Cited

U.S. PATENT DOCUMENTS

| | | | |
|---|---|---|---|
| 3,799,575 | 3/1974 | Kurze et al. | 280/743 |
| 4,944,527 | 7/1990 | Bishop et al. | 280/743 |
| 5,031,932 | 7/1991 | Frantom et al. | 280/741 |

FOREIGN PATENT DOCUMENTS 422840  4/1991  European Pat. Off. ............ 280/728

*Primary Examiner*—Karin L. Tyson
*Attorney, Agent, or Firm*—Markell Seitzman

[57] ABSTRACT

An assembly comprising: an inflator (20) for providing inflation gas, including a cylindrical body (22, 44) having at least one exhaust port (42a,b) located on a wall thereof through which a stream of inflation gas (40) exits, and a retainer (140) for securing the inflation means, including a hollow cylindrical retainer body for receipt of the inflation means and for diverting the inflation gas stream into a diffuser. The diffuser (210) comprises an inflatable gas permeable portion (212) for receiving the inflation gas stream such that when the inflation gas exits the gas permeable portion such inflation gas is generally uniformly distributed therethrough and communicated to an air bag. The diffuser includes a first portion (216a,b) attached the gas permeable portion and secured to the retainer. The air bag (230) is secured about the diffuser, for receipt of the inflation gas exiting the diffuser. The air bag as well as the gas permeable portion of the diffuser is maintained in a folded pre-inflation condition and expandable in response the inflation gas entering therein.

7 Claims, 6 Drawing Sheets

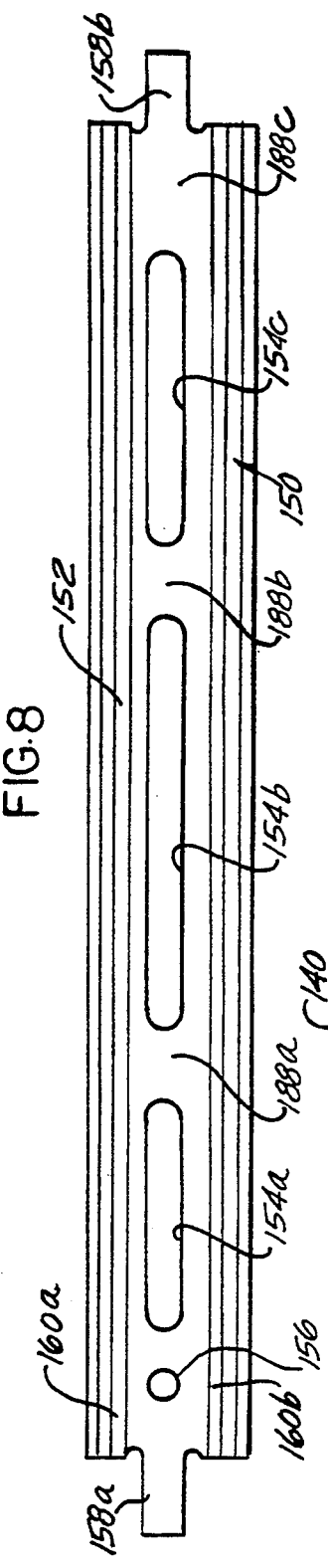
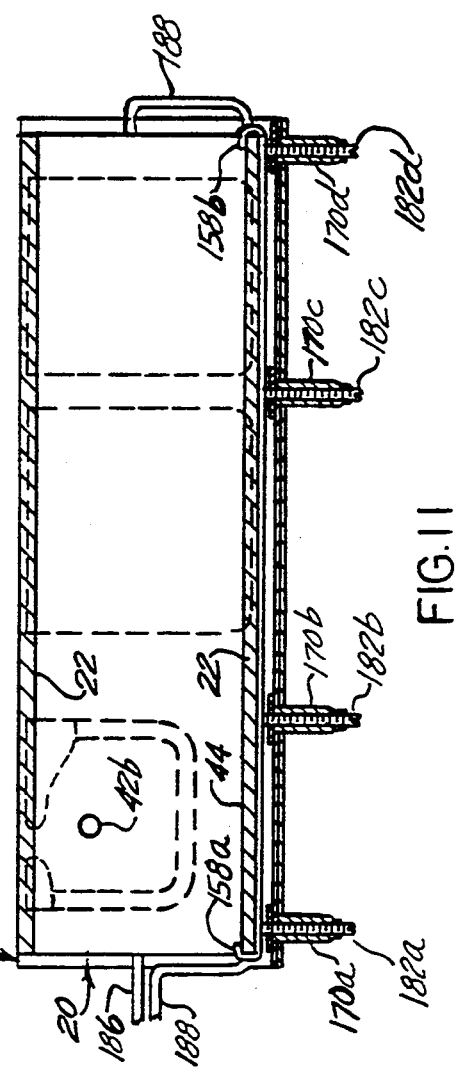

AIR BAG INFLATOR ASSEMBLY

BACKGROUND AND SUMMARY OF THE INVENTION

The present invention is generally related to an air bag assembly comprising a gas inflator, a retainer and an air bag and more specifically, to an air bag assembly comprising a hybrid inflator.

Inflatable restraint systems have become the norm for passenger protection. A rudimentary system comprises a crash sensor mounted to a vehicle frame and an air bag assembly positioned within the passenger compartment. The present invention finds specific application with a passenger side air bag restraint system. One such system comprises a cylindrical gas generator secured in place by a hollow cylindrical retaining member. Such a system is illustrated in the commonly owned U.S. Pat. No. 5,062,664. The retaining member is adapted to be secured to a cooperating vehicle structure such as a portion of the instrument panel as is known in the art. An air bag is disposed about the retaining member to receive inflation gas from the inflator. The present invention comprises an improvement to a passenger side safety restraint system.

Accordingly, the invention comprises an assembly comprising: an inflator for providing inflation gas, including a cylindrical body having at least one exhaust port located on a wall thereof through which a stream of inflation gas exits, and a retainer for securing the inflation means, including a hollow cylindrical retainer body for receipt of the inflation means and for diverting the inflation gas stream into a diffuser. The diffuser comprises an inflatable gas permeable portion for receiving the inflation gas stream such that when the inflation gas exits the gas permeable portion such inflation gas is generally uniformly distributed therethrough and communicated to an air bag. The diffuser includes a first portion attached the gas permeable portion and secured to the retainer. The air bag is secured about the diffuser, for receipt of the inflation gas exiting the diffuser. The air bag as well as the gas permeable portion of the diffuser is maintained in a folded pre-inflation condition and expandable in response the inflation gas entering therein. The retainer is formed from a flat metal sheet which includes a plurality of louvers to deflect the inflation gas. A wire track is provided to protect certain wires extending from the inflator.

Many other objects and purposes of the invention will be clear from the following detailed description of the drawings.

BRIEF DESCRIPTION OF THE DRAWINGS

In the drawings:

FIGS. 8–10 illustrate a plan view, a side view and a cross-sectional view of a wire track.

FIGS. 11 and 12 illustrate various views of a retainer having an inflator secured therein.

DETAILED DESCRIPTION OF THE DRAWINGS

Figure 1:
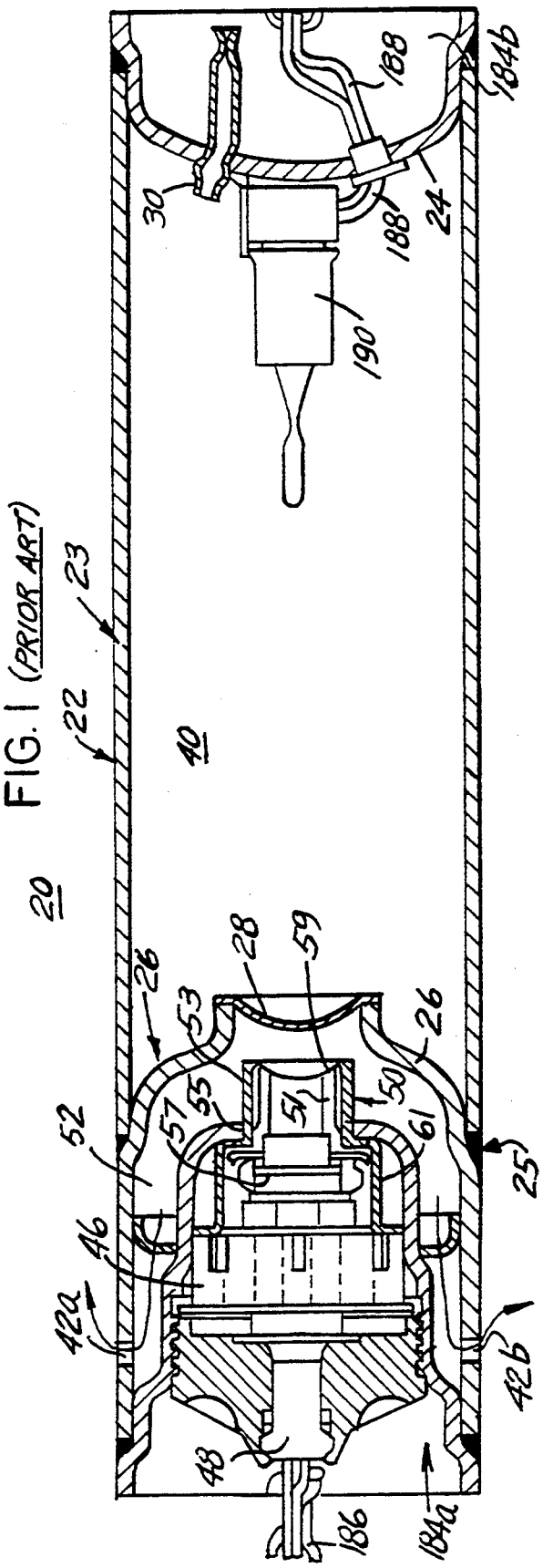
FIG. 1 illustrates a schematic view of a typical hybrid inflator.
Figure 2:
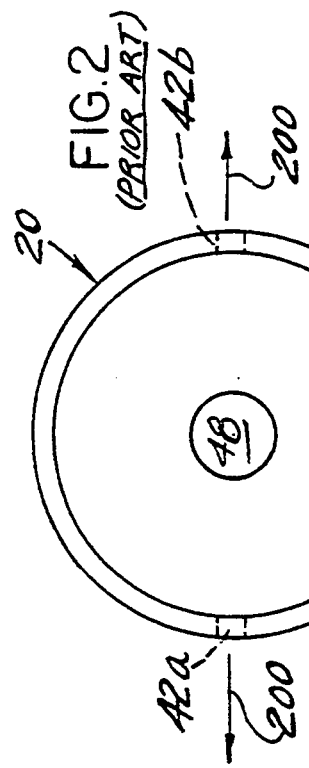
FIG. 2 illustrates a plan end view of the inflator.

FIG. 1 illustrates the construction of a hybrid inflator 20. The inflator 20 comprises a cylindrically shaped structure including a pressure vessel portion 23 and a non-pressure vessel portion 25. The pressure vessel 23 comprises a cylindrically shaped sleeve 22 having open ends sealed by end caps 24 and 26. The end cap 26 supports a burst disk 28. Means such as a fill tube 30 are provided to insert a quantity of Argon gas 40 into the pressure vessel portion of the hybrid inflator. The end cap 26 which also forms part of the non-pressure vessel portion 25 includes a plurality of exit ports 42a and 42b generally disposed opposite one another to provide for a thrust neutral condition as inflation gases exit therefrom. Positioned within the end cap 26 is a gas generator assembly 44 comprising propellant 46, an initiator 48 and a piston assembly generally shown as 50. The purpose of this piston assembly is to rupture the disk 28. The piston assembly 50 includes a piston 51 slidably positioned in a sleeve 53. The piston and sleeve are connected together by shear pins 55. One end of the piston is covered by a second burst disk 57, the other end of the piston includes cutting edges 59. As the propellant 44 burns, a pressure is created which builds up on the second burst disk 57. At some pressure level shear pins 61, which join the piston and sleeve, are broken and the piston is propelled into the first burst disk 28 permitting the release of the stored, pressurized Argon gas 40. As the propellant continues to burn the pressure exerted on the second burst disk builds and eventually ruptures this disk 57. The rupturing of the second disk permits the heated products of combustion of the buring propellant to mix with the Argon gas heating same as it exists the inflator 20. One such hybrid inflator is shown in U.S. Pat. No. 5,076,607, which is incorporated herein by reference. The stored inflation gas 40 as well as the products of combustion produced by the burning propellant 46 flow through the ruptured disk 28, between a passage 52 between end cap 26 and the gas generator housing 44 and exit the exhaust ports 42a and 42b. FIG. 2 diagramatically illustrates the inflation gases exiting from such ports and further illustrates the thrust neutral condition achieved.

It should be appreciated by those skilled in the art that the inflator 20 can be secured by the retaining mechanism shown in U.S. Pat. No. 5,062,664 and that an air bag can be disposed about such a retaining mechanism. As mentioned above, the inflator 20 comprises the exit ports 42a and 42b and as can be seen, these ports are in an offset orientation relative to the overall cylindrical length of the inflator. Upon activation of the inflator 20, the inflation gases 200 exit from these offset exit ports and will enter one end of the air bag. As can be appreciated, since the inflation gases are directed into one end of the air bag, one might expect the air bag 230 to inflate asymmetrically during the first moments of inflation and achieve the shape which is diagramatically illustrated in FIG. 3. As will be noted from the description below, the present invention provides for the uniform deployment of an air bag.

Figure 4:
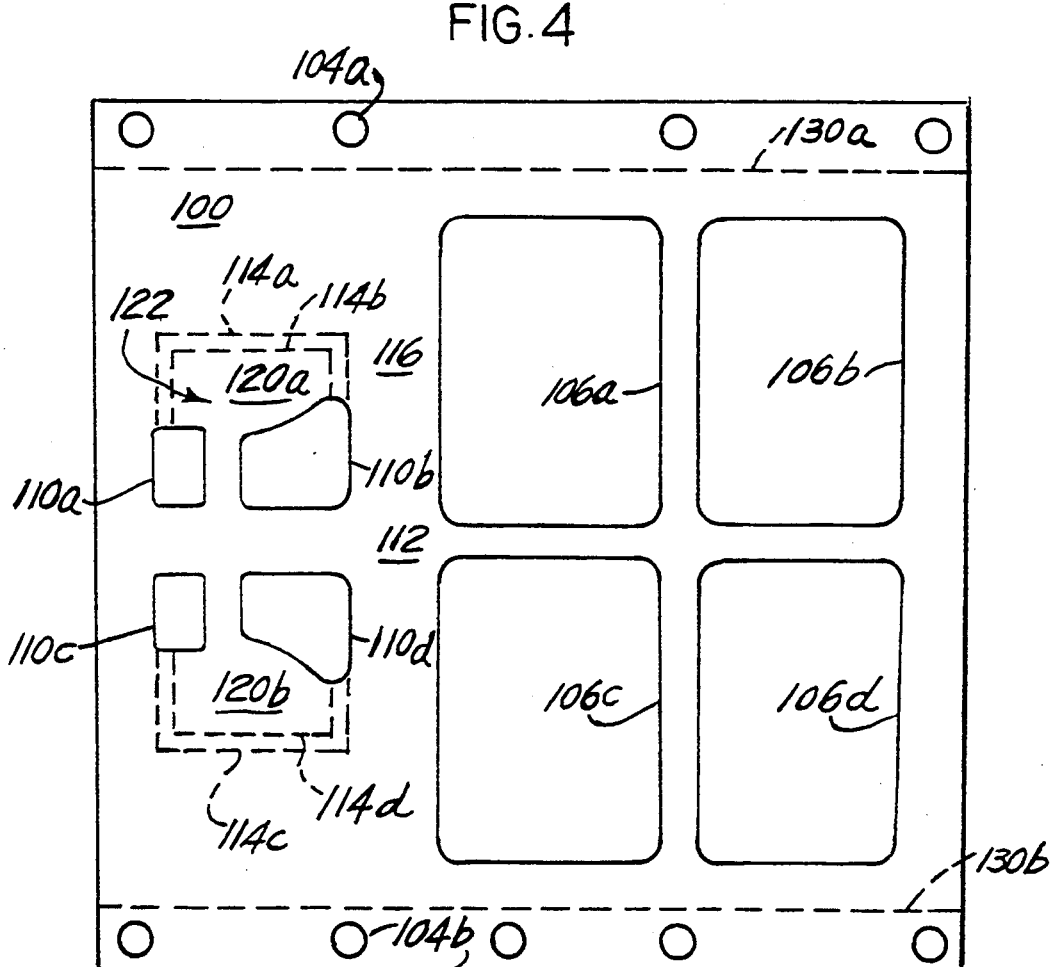
FIG. 4 illustrates a generally square shaped, flat metal sheet.
Figure 5:
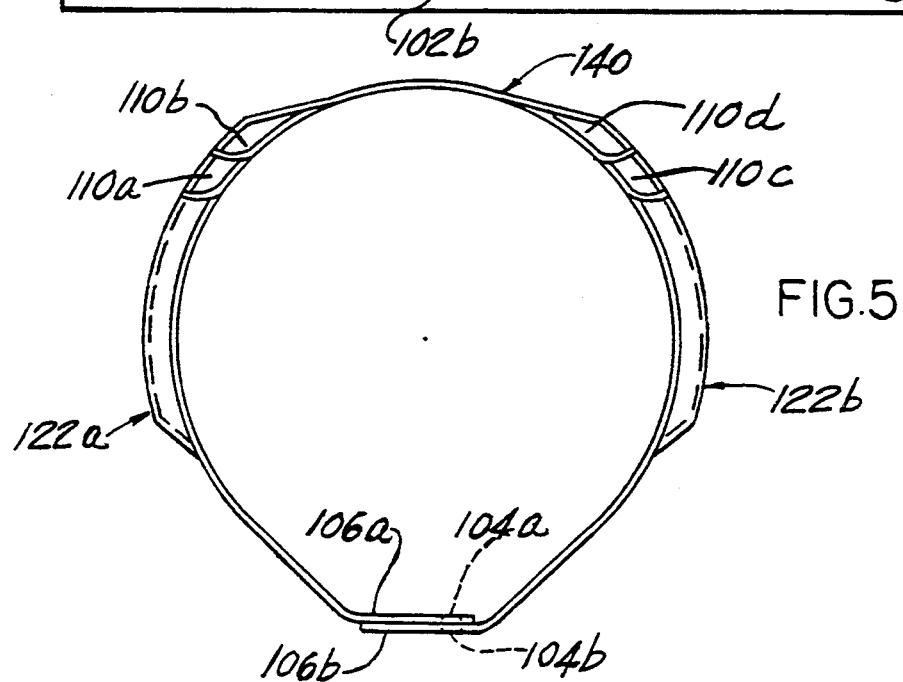
FIG. 5 illustrates an end view of a retainer.
Figure 6:
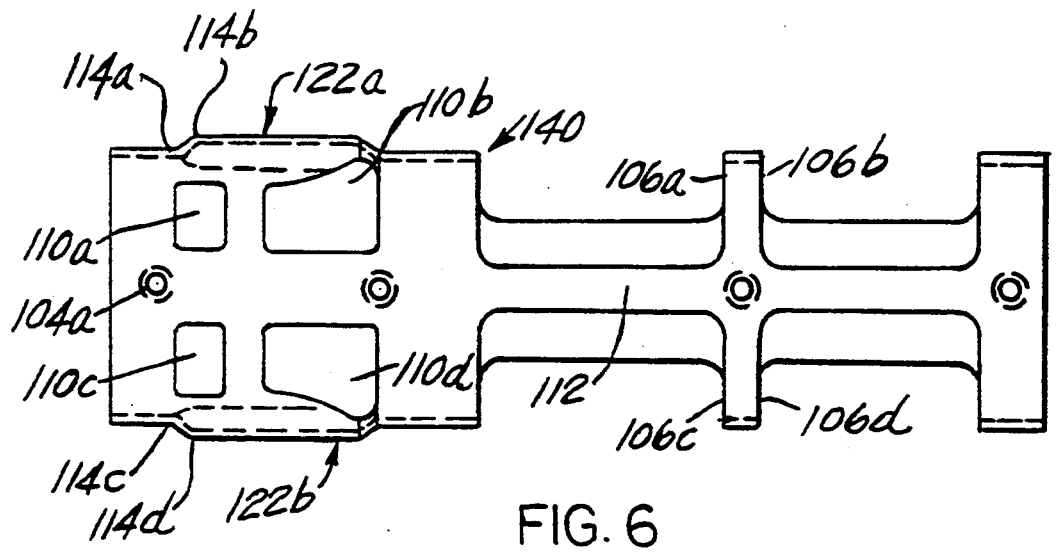
FIGS. 6 and 7 illustrate a top and a side view of the retainer.
Figure 7:
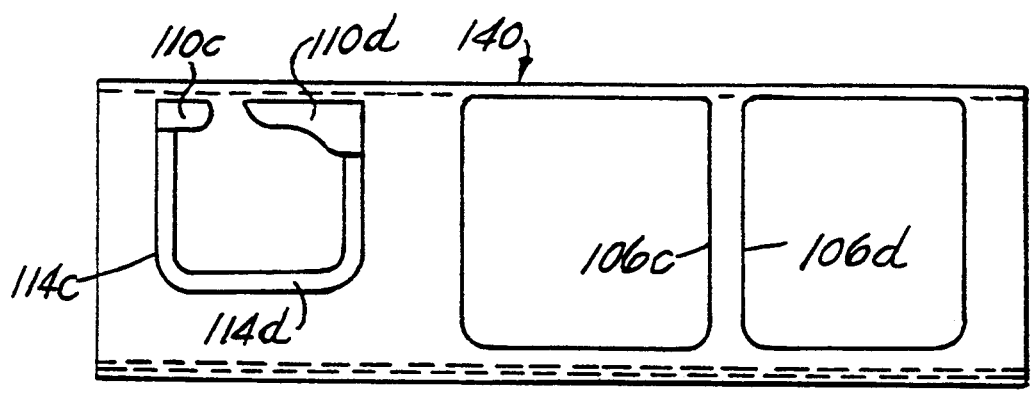

Reference is now made to FIG. 4 which illustrates a generally square shaped, flat metal sheet 100. The plate 100 comprises a first side 102a and an opposing side 102b. Positioned proximate the edge of these sides are a first and a second plurality of openings 104a and 104b. The right hand portion of sheet 100 includes other larger openings 106a–d. These openings 106 can be formed such as by stamping out portions of the sheet in a known manner. To the left of openings 106 are two sets of smaller openings 110a, 110b, 110c and 110d, symmetrically disposed about a center region 112. These openings 110 may generally be formed at the time openings 106 are formed. FIG. 4 also illustrates two sets of phantom lines, 114a, 114b, and 114c, 114d about openings 110a and 110b. After the openings 106a–106d and 110a–110d are formed the sheet is stamped thereby raising the portion of the sheet 120a, 120b within the phantom lines 114b and 114d from the main flat portion 116 of the sheet. In essence, lines 114a–d illustrate the transition lines of the stamping. As will be described below, the raised portions 120a and 120b of the sheet, resulting from the stamping process, in cooperation with the various openings 110a–d, form two louvers which are generally shown as 122a and 122b. After the above process is completed, the sheet 110 is formed into the generally cylindrical shape shown in FIG. 5 to form a retainer 140. As can be appreciated, FIG. 5 is an end view of the formed sheet. To achieve this orientation the material proximate the openings 104a and 104b is bent at locations or lines 130a and 130b and thereafter the sheet is rolled over wherein the various openings 104a and 104b are in an aligned, registered orientation one to the other. Thereafter, the overlapping edge portions 106a and 106b of the sheet 100 are secured together. Such securement may be accomplished by a variety of methods such as by welding or alternatively, by a metal staking or metal stitching process. FIG. 6 and FIG. 7 illustrate a top and a side view of the formed retainer 140 from which can be seen the louvers 122a and 122b, their corresponding openings 110a–d, the various transition edges 114a–d, and the elevated materials portions 120a and 120b.

Reference is now made to FIGS. 8, 9 and 10. These figures illustrate various views of a wire track 150. The purpose of this wire track will become clear from the descriptions below. The track 150 comprises an elongated generally rectangular body 152, cut outs or openings 154a–c and an opening 156. Extending from the body 152 are oppositely positioned tabs 158a and 158b. The sides of the body 152 are formed with longitudinally extending channels or grooves 160a and 160b. The central portion of the body, in which the various openings 154a–154c and 156 are located is elevated relative to the grooves 160a and 160b. As will be seen from the discussion below, certain wires 188 are inserted in the grooves (see FIG. 10) and the body 152 may be crimped at various locations 155 to secure the wire(s) therein (see FIG. 9).

Figure 12:
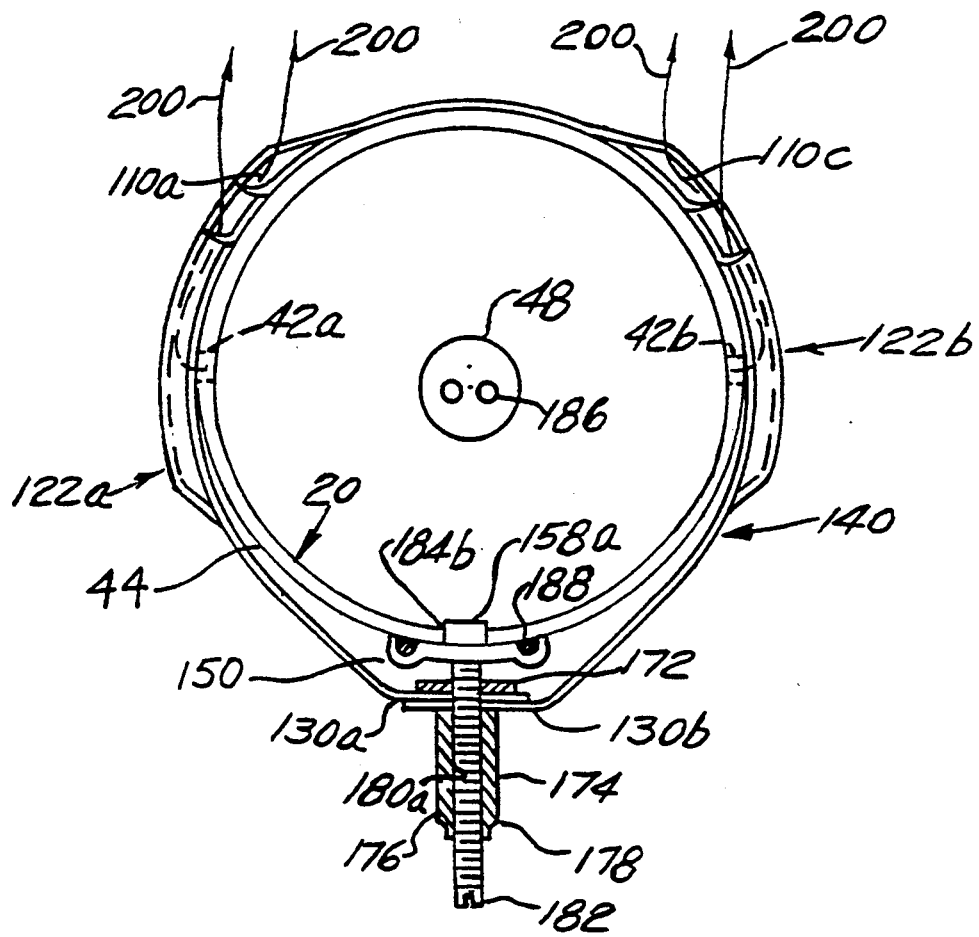

Reference is made to FIGS. 11 and 12. As can be seen, FIG. 11 is similar to FIG. 7, while FIG. 12 is similar to FIG. 5. FIG. 12 also illustrates a fastener generally shown as 170. The fastener 170 includes a head 172 and a tubular shaft 174. The shaft includes exterior threads 176 and interior threads 178 about a bore 180. A threaded set screw 182 is received within the interior threads 178. FIGS. 11 and 12 also illustrate the inflator 20 positioned within the retainer 140. In addition, the wire track 150 has been located on the bottom of the inflator 20. The tabs 158a and 158b have been bent into the cup shaped end openings 184a and 184b defined by the gas generator body 44 and end cap 24. The various sets of wires such as 186 extending from the squib 48 or alternatively, as illustrated, wires 188 from a pressure sensor 190, secured to the end cap 24 are positioned within respective channels 160a and 160b of the track 150. As mentioned, these wires are secured in the grooves by crimping the grooves about the wires, at least at selective positions along the track 150.

As can be seen from FIG. 11, a fastener 170 has been inserted into the retainer 140 into each overlapping set of holes 104a, 104b and a respective set screw 182a–d has been inserted within each respective fastener 170a–d.

As can be also seen from FIGS. 11 and 12, the inflator 20 has been oriented within the retainer 140 so that the exit ports 42a and 42b lie generally opposite respective louvers 122a and 122b. In addition, it can be seen that each bolt 182a–182d has been threaded within its corresponding fastener 170a–d to exert an upward force on the inflator 20 thereby pressing the inflator into the retainer 140 and securing same therein. As can be appreciated from FIGS. 11 and 8, the set screws 182b, 182c and 182d do not directly contact the pressure vessel portion of the inflator 20 but rather contact locations 188a, 188b and 188c of the wire track 150. Set screw 182a is received within opening 156 of the wire track 150 and directly urges the inflator 20 upwardly as it contacts the non-pressure vessel portion 25 and holds the inflator axially as the set screw 182a deforms this portion 25 of the inflator 20.

Figure 3:
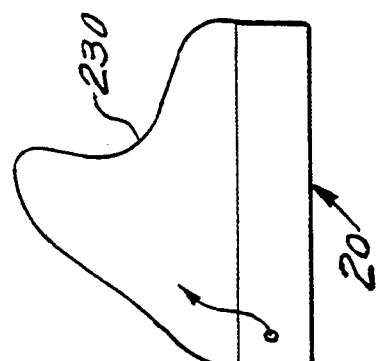
FIG. 3 illustrates an asymmetrically inflated air bag.
Figure 13:
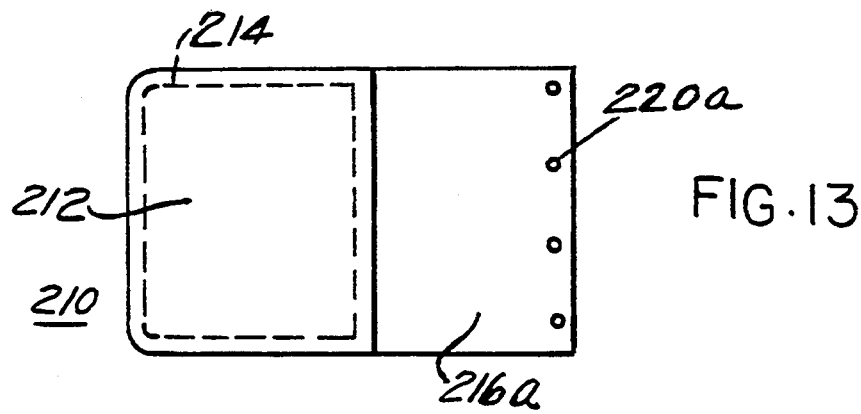
FIGS. 13 and 14 illustrate views of a diffuser.
Figure 14:
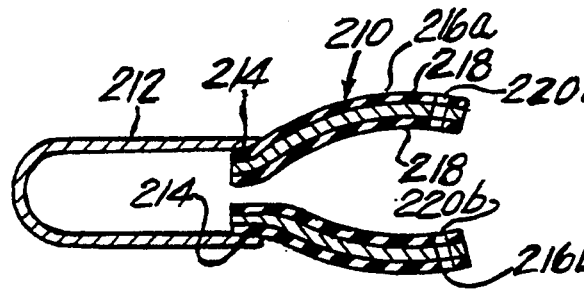

As mentioned above, upon activation of the gas generator 44 and in particular the squib 48, the propellant 46 is caused to burn thereby causing a build up of pressure causing the piston assembly to rupture the burst disk 28. Thereafter, the Argon gas and the products of combustion due to the burning propellant 46 exit the various exit ports 42a and 42b. The flow of inflation gas is generally shown by arrows 200. The inflation gas impacts the corresponding louvers 122a and 122b (see FIGS. 2 and 12) and is directed and reflected generally perpendicularly to flow out of corresponding openings 110. This inflation gas will inflate an air bag which is located about the retainer 140. Without any additional components the air bag would tend to achieve, during the initial moments of inflation, the asymmetrical shape as illustrated in FIG. 3. The present invention further includes a diffuser 210 shown in FIGS. 13 and 14. The diffuser 210 includes a gas permeable portion 212 preferably fabricated of a heat resistant knitted fabric such as Kevlar. This portion 212 is formed as a small bag by stitching the gas permeable fabric along stitch lines 214. The gas permeable portion 212 is connected with two flaps 216a and 216b. These flaps may be constructed of air bag material, i.e., woven nylon, coated with neoprene 218 as shown in FIG. 14. The width of this neoprene coating has been enlarged for illustration purposes. Each flap 216a and 216b includes a plurality of openings 220a and 220b.

Figure 15:
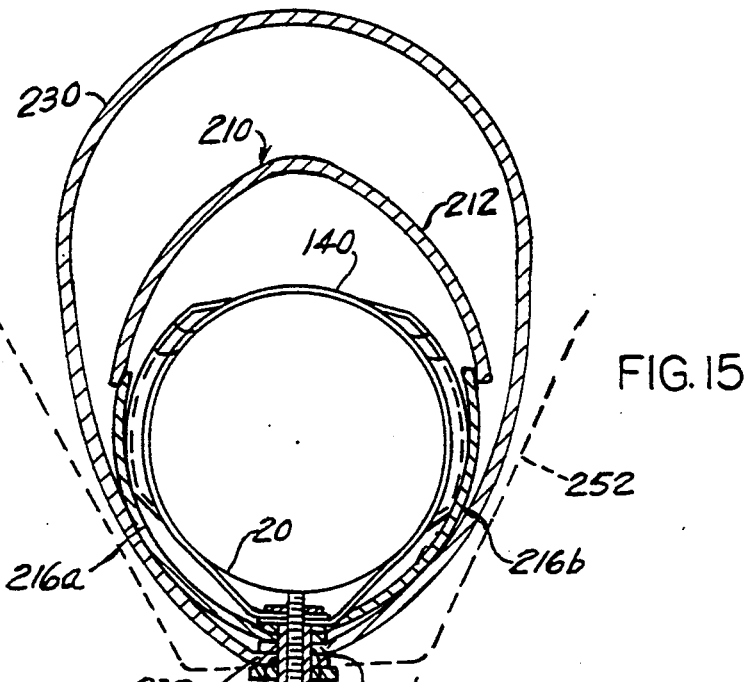
FIG. 15 illustrates an end cross-sectional view of an air bag assembly illustrating a retainer, diffuser and air bag.

Reference is made to FIG. 15. The diffuser 210 is mounted upon the retainer 140 with the respective flaps 216a, 216b enveloping the lower portion of the retainer 140. The various openings 220 in each flap are secured about corresponding fasteners 170 in an overlapping relation. An inflatable air bag 230 is secured about the diffuser 210. The air bag includes flap portions 232a and 232b. Each flap portion includes a plurality of openings 234a and 234b which are also secured about corresponding fasteners 170a–d. The air bag 230 may generally take the form of air bag 20 illustrated in the commonly owned U.S. Pat. No. 4,964,654 which is incorporated herein by reference. The various flaps 232a and 232b are mounted in overlapping relationship as illustrated in FIG. 15. In the non-inflated condition, the air bag 230 and diffuser 210 are stored in a folded configuration (not shown). This configuration may be maintained by enveloping the air bag 230 with a tearable layer of material such as Tyvek as also shown in the above-mentioned patent. The various layers of material may be secured to the retainer by a nut 240 secured about the exterior threads 176 of the fastener 170. In operation within the vehicle, the assembly 250 comprising the inflator 20, retainer 140, diffuser 210 and air bag 230 are secured within a cooperating portion of the vehicle proximate the instrument panel by the various fasteners 170a–d and secured by additional nuts, also received about the exterior threads 176 of each fastener. A protective housing 252 or open ended can may be provided as often used in the prior art. The can 252 is shown by a phantom line in FIG. 15.

Figure 16:
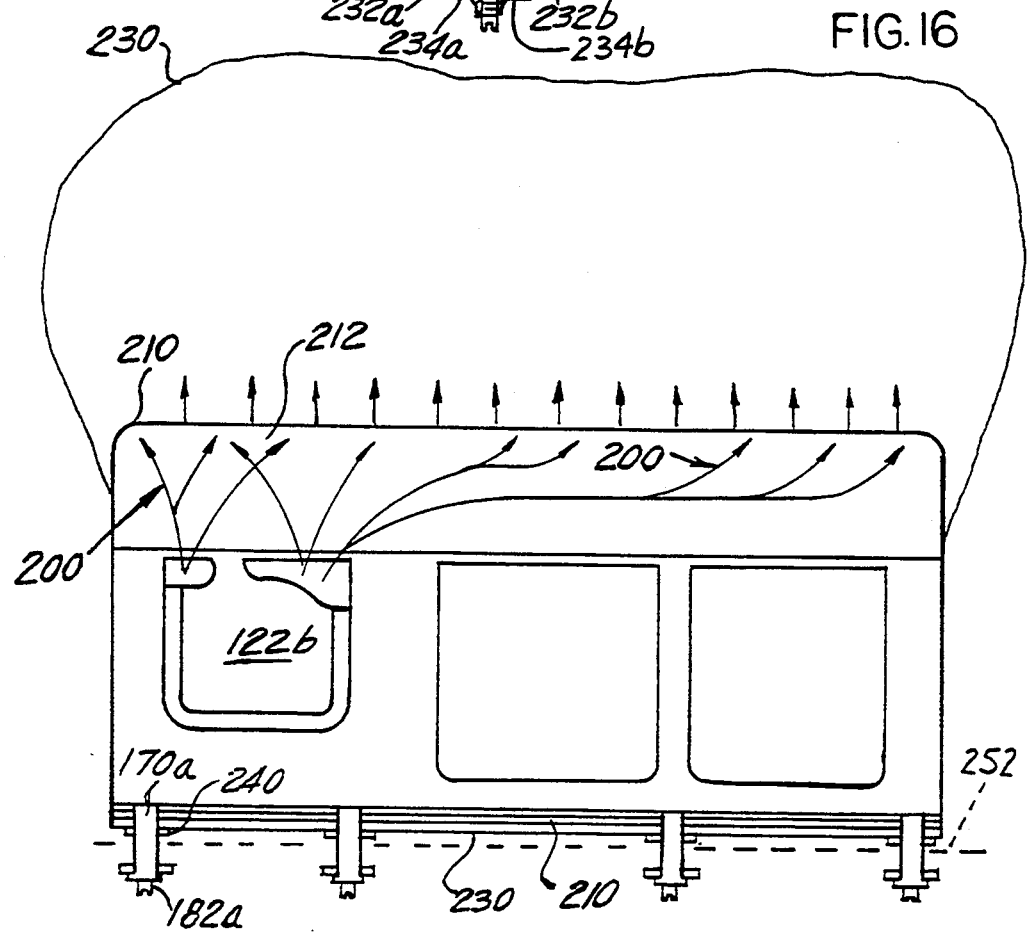
FIG. 16 illustrates a side plan view of the assembly as shown in FIG. 15.

Upon activation of the gas generator 44, the inflation gas 200 exits the exit ports 42a and 42b and enters the diffuser 210 through the various openings 110a–d whereupon the inflation gas is distributed within the permeable portion 212 of the diffuser in a manner as illustrated in FIG. 16. Thereafter the inflation gas exits the diffuser 210 in a generally uniform manner and enters the air bag 230 to uniformly inflate same.

Many changes and modifications in the above described embodiment of the invention may, of course, be carried out without departing from the scope thereof. Accordingly, that scope is intended to be limited only by the scope of the appended claims.

We claim:

1. An apparatus comprising:
   inflation means for providing inflation gas, including at least one exhaust port located on a wall thereof through which a stream of inflation gas exits,
   retainer means for securing the inflation means, including a hollow retainer body and fastener means for securing the inflation means thereto;
   wherein each fastener means comprises a head positioned interior the retainer body about a designated opening, a stud extending through such opening, an exterior thread for attachment to a cooperation structure to secure the retainer means thereto, a bore extending through the stud and head and internal threads within the bore and a set screw received in the internal threads such that when the set screw is inserted therein an end of the set screw extends beyond the head to force the inflator means into a portion of the retainer means.

2. The assembly as defined in claim 1 wherein the inflation means includes a pressure vessel portion into which inflation gas is stored and a non-pressure vessel portion, comprising a gas generator portion including initiator means and a propellant wherein upon receipt of a signal indicative of a crash situation the initiator means causes the propellant to burn causing the release of the inflation gas.

3. The assembly as defined in claim 1 wherein the assembly includes a track secured to the inflation means for securing wires extending from the inflation means.

4. The assembly as defined in claim 3 wherein the track includes at least one groove or channel wherein a wire is positioned in a corresponding groove and secured to the track.

5. The assembly as defined in claim 3 wherein one of the set screws of a particular fastener means extends through the track and directly contacts the inflation means in its non-pressure vessel portion urging the inflation means into an opposing portion of the retainer means, and axially securing the inflation means, the other set screws of the other fastener means impacting the track urging track away from the retainer means and causing the track to urge the inflation means into the opposing portion of the retainer means to secure the inflation means thereto.

6. The assembly as defined in claim 1 wherein the retainer means comprises a flat sheet comprising a first side and an opposing side, a plurality of first openings disposed along the first side and a like plurality of second openings disposed along the second side, the flat sheet being formed into a generally cylindrical shape to form the retainer means, with the first opening and second openings in overlapping registration to one another, wherein each fastener means inserted through corresponding first and second openings.

7. The apparatus as defined in claim 1 including air bag means operatively secured about the retainer means, for receipt of the inflation gas exiting therefrom, the air bag means maintained in a folded pre-inflation condition and expandable in response to the inflation gas entering therein.

* * * * *